United States Patent [19]

Jäger

[11] Patent Number: 4,929,397
[45] Date of Patent: May 29, 1990

[54] APPARATUS FOR AERATING WATER

[75] Inventor: Andreas Jäger, Burgdorf, Fed. Rep. of Germany

[73] Assignee: Arnold Jäger, Burgdorf, Fed. Rep. of Germany

[21] Appl. No.: 331,470

[22] Filed: Mar. 30, 1989

[30] Foreign Application Priority Data

Mar. 30, 1988 [DE] Fed. Rep. of Germany ....... 3810790

[51] Int. Cl.$^5$ .............................................. B01F 3/04
[52] U.S. Cl. ...................................... 261/65; 261/87; 261/122
[58] Field of Search ........................... 261/122, 87, 65

[56] References Cited

U.S. PATENT DOCUMENTS

| | | | |
|---|---|---|---|
| 1,717,713 | 6/1929 | Logan | 261/122 |
| 1,834,646 | 12/1931 | Sandor | 261/122 |
| 2,650,810 | 9/1953 | Nordell | 261/121.1 |
| 3,163,684 | 12/1964 | Gilbert | 261/124 |
| 3,606,985 | 9/1971 | Reed | 261/124 |
| 3,808,123 | 4/1974 | Neel | 261/124 |
| 3,911,064 | 10/1975 | McWhirter et al. | 261/87 |
| 4,193,950 | 3/1980 | Stockner et al. | 261/87 |
| 4,474,714 | 10/1984 | Downs | 261/124 |
| 4,557,879 | 12/1985 | Weber | 261/122 |
| 4,581,137 | 4/1986 | Edwards | 261/122 |

FOREIGN PATENT DOCUMENTS

| | | | |
|---|---|---|---|
| 3124233 | 1/1983 | Fed. Rep. of Germany | 261/122 |
| 3524405 | 1/1987 | Fed. Rep. of Germany | 261/122 |

Primary Examiner—Tim Miles
Attorney, Agent, or Firm—Robert W. Becker & Associates

[57] ABSTRACT

An apparatus for aerating water, including rigid supporting pipes, which serve to supply air, and covers which are disposed on the supporting pipes close thereto and are provided with a plurality of resiliently expandable slits. The supporting pipes, together with their covers, are disposed virtually in a vertical plane one above the other in a horizontal parallel position. The covers and/or the supporting pipes have air supply openings of different sizes such that these openings, when viewed from bottom to top, become gradually smaller in order to ensure that, when the air supply means is common to all of the supporting pipes and covers of an apparatus, the air throughput quantities are at least substantially identical in size at the different vertical positions of the supporting pipes and covers.

12 Claims, 1 Drawing Sheet

APPARATUS FOR AERATING WATER

BACKGROUND OF THE INVENTION

The present invention relates to an apparatus for aerating water, and comprises rigid supporting pipes, which serve to supply air, and covers which are disposed thereon and are provided with resiliently expandable slits.

In known apparatus of this type, the supporting pipes, together with their covers, are disposed in such a way as to be distributed in an essentially horizontal plane over the bottom of the water that is to be aerated.

It is also known to provide aerating arrangements wherein the aerators are disposed in a carousel-like manner and can be rotated about a vertical axis. Here too apparatus units that are disposed in only a horizontal plane are utilized.

It is an object of the present invention to provide an apparatus of the aforementioned general type that ensures a high throughput of air with very fine air bubbles in a confined area, and that also additionally makes possible, for these reasons, an arrangement for the rotatable mounting about a horizontal axis.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
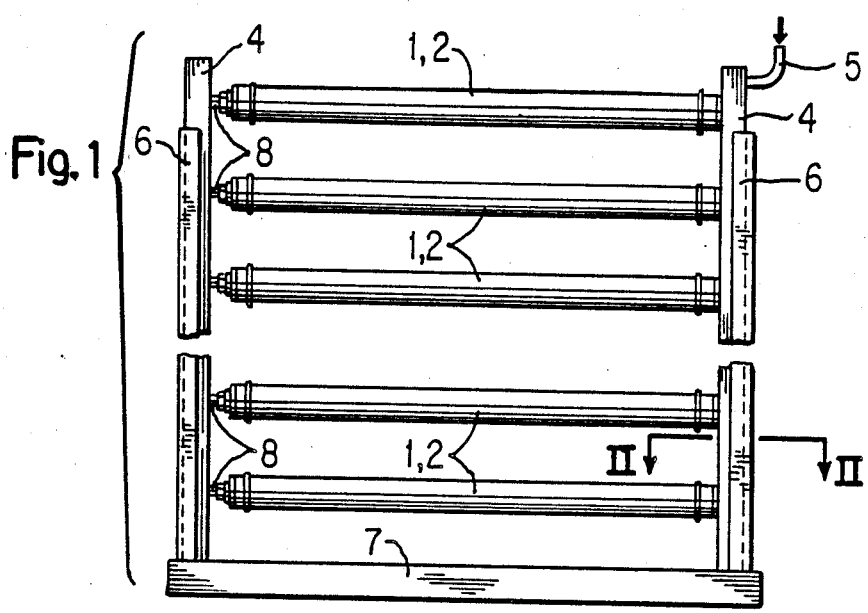
FIG. 1 is a view that shows one exemplary embodiment of the inventive aerating unit for water.
Figure 2:
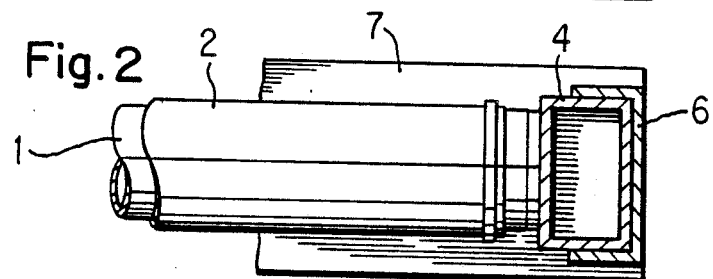
FIG. 2 is a cross-sectional view taken along the line II—II of FIG. 1.

The apparatus of the present invention is characterized primarily in that the supporting pipes, together with their slitted covers, are disposed virtually in a vertical plane one above the other in a horizontal parallel position and, in addition, the covers and/or the supporting pipes have air supply openings of different sizes or throughput capacities such that the unobstructed openings, when viewed from the lower supporting pipe, become gradually or progressively smaller in an upwardly direction in order to ensure that, when the air supply means is common to all of the supporting pipes of an apparatus or aerating unit, the air throughput quantities are virtually identical in size, or at least substantially identical in size, at the different vertical positions of the supporting pipes and covers.

To ensure such an arrangement of the supporting pipes with their covers, the supporting pipes are disposed in a rung-like manner between two vertically disposed struts and are connected to the latter in a suitable manner. The two struts, and the supporting pipes that are provided with the covers and connect the struts, form a unit which, according to the invention, can be inserted into a support or holder from above in a cassette-like manner. The holder advantageously has laterally disposed U-shaped retaining clamps that can be used for the insertion of the struts. Such a mounting of the units permits rapid assembly or dismantling when erecting and operating a plant.

Air supply pipes can be disposed centrally in the supporting pipes; these central pipes ensure the actual connection between the two struts, and receive the air via the struts. The central or air supply pipes, in turn, can then discharge the air into the supporting pipes via bores or openings in their walls. From there, the pressurized or compressed air passes beneath the cover, and from there the air escapes in a bead-like or bubble-like manner into the water via the expandable slits.

In order to permit the amount of air supplied to the various supporting pipes to be adjusted, the air supply pipes are provided with axially displaceable sleeves that can cover openings to a greater or lesser extent. In consequence, the distribution of the air to the individual supporting pipes can be effectively achieved Further specific features of the present invention will be described in detail subsequently.

DESCRIPTION OF PREFERRED EMBODIMENTS

Referring now to the drawing in detail, an aerating unit comprises a plurality of rigid supporting pipes 1 that are disposed in one plane and are provided with rubber covers 2, which are disposed on the supporting pipes close thereto and are provided with a plurality of fine slots or slits 3 for the bead-like or bubble-like discharge of the air that is to be conducted into the water.

The ends of the supporting pipes 1 are connected to vertical struts 4 that are in the form of rectangular pipes. This results in a substantially ladder-like structure, with the supporting pipes 1 forming the rungs. The aerating unit is supplied with pressurized or compressed air via an angle pipe or elbow 5 or a hose that is connected thereto. The compressed air passes into the right-hand strut 4 and from there into the supporting pipes 1.

In order to be able to keep the aerating unit in the water, and in order to permit simple assembly and/or dismantling, a support or holder is provided that comprises two U-shaped retaining clamps 6 and a crosspiece 7. The aerating unit is introduced into the holder from above in a cassette-like manner, with the struts 4 being slipped into the retaining clamps 6 until they eventually rest on the crosspiece 7 at their bottom end.

The crosspiece 7 can be mounted in a stationary manner, for example on the base of an aeration tank, or can be mounted on a rotor, but in each case the struts 4 always extend vertically, so that the individual supporting pipes 1 lie in a vertical plane in a parallel position one above the other.

The crosspiece 7, if mounted on a rotor, would be rotatable about a vertical axis, and could support several pairs of retaining clamps 6, with each such pair supporting a respective ladder-like aerating unit structure, which could be disposed in a carousel-like manner and would be rotatable together.

Figure 3:
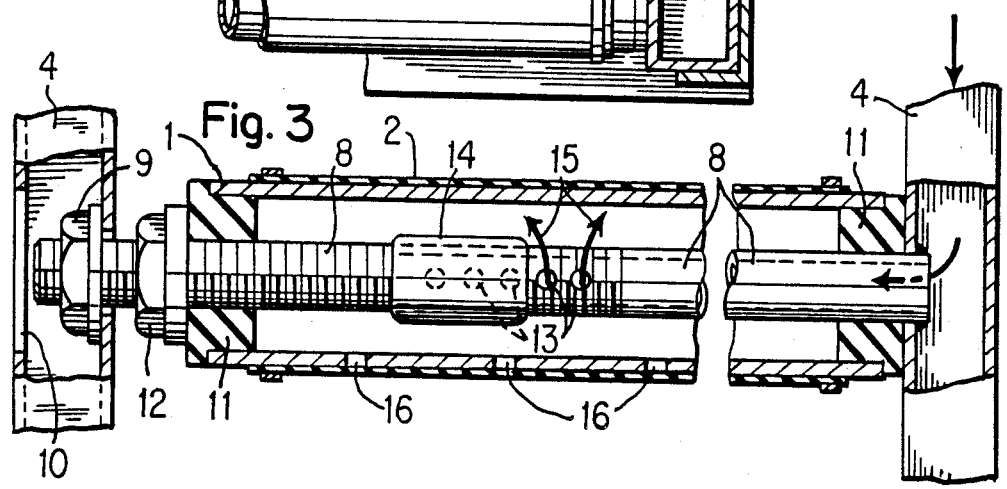
FIG. 3 is a vertical, cross-sectional view of a portion of the unit of FIG. 1.
Figure 4:
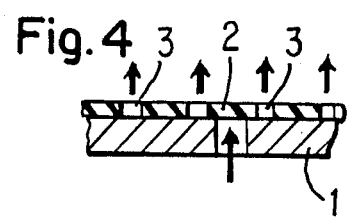
FIG. 4 is a partial, vertical, cross-sectional view through a supporting pipe with a cover.
Figure 5:
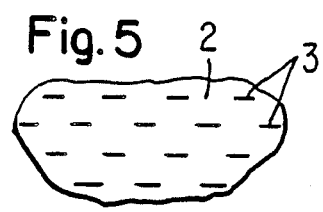
FIG. 5 is a plan view of the cover portion shown in FIG. 4.

FIG. 3 shows details of the mounting of the supporting pipes 1 on the struts. A rigid central pipe 8 is provided for this purpose and is securely welded to the strut 4 that effects the supply of air. The free end of the central pipe 8 protrudes into the left-hand strut 4, where a screwed-on nut 9, which is accessible through an opening 10 in the strut 4, abuts internally against the strut 4. The central pipe 8 is closed in the region of the left-hand strut 4, whereas it is open at the right-hand strut 4 for the supply of air. The central pipe 8 supports the rigid supporting pipe 1 in a resilient manner via the utilization of compact rubber rings 11 that surround the central pipe 8 and securely and with initial tension abut against the ends of the supporting pipe 1 internally and against the end faces. Accordingly, for reasons of resilience, the supporting pipe 1 is joined to the central pipe 8 only by the rubber. A threaded nut 12 that is situated on the free end of the supporting pipe 1 is used for tensioning purposes.

The central pipe 8 has a plurality of openings 13 that are disposed axially one behind the other and that can be closed to a greater or lesser extent by a screwed-on sleeve 14. The air that flows through in the direction of the arrows 15 arrives via openings 16 below the cover 2, which is made of rubber or the like and is provided with fine slits 3 that are normally closed. These slits 3 open under the influence of air pressure and allow fine bubbles to enter the water. The slits 3 close when the air supply is discontinued or interrupted.

By twisting the sleeve 14 the air supply is adjusted for the various supporting pipes 1 and covers 2, and in particular in such a manner that the upper supporting pipes 1 and the lower supporting pipes receive different air supply cross-sections, so that different water pressures can be compensated for and virtually the same quantity of air flows from the covers. This phenomenon prevents more air from flowing out of the upper covers 2, and the influence of the water pressure is compensated for.

It should also be mentioned that, as a result of the threaded nut 9, the left-hand strut 4 can also be drawn towards the nut 12, where it can be clamped in position.

For the attachment of the supporting pipes 1, it is also important that at least one strut 4 be detachable in order to permit the supporting pipes 1 and/or covers 2 to slide over the central pipe 8 for their attachment and replacement.

The present invention is, of course, in no way restricted to the specific disclosure of the specification and drawing, but also encompasses any modifications within the scope of the appended claims.

What I claim is:

1. An apparatus for aerating water, comprising:
   rigid supporting pipes that serve to receive air and are provided with first opening means for the discharge of air; and
   respective covers closely disposed on said supporting pipes for receiving air from said first opening means thereof, with said covers being provided with second opening means in the form of slits that are resiliently expandable in response to air received from said supporting pipes, whereby said supporting pipes and said covers together are disposed in an essentially vertical plane, with respective supporting pipes, with their covers, being horizontally disposed above and parallel to one another, and with at least one of said first and second opening means having throughput capacities such that when viewed from the bottom to the top, said throughput capacities become progressively smaller, so that in the case of a common air supply means for all of said supporting pipes and covers of said apparatus, at least essentially identical air throughputs are assured at the different vertical levels of said supporting pipes and their covers.

2. An apparatus according to claim 1, which has an essentially ladder-like structure comprised of struts and rungs, with said rungs being formed by said supporting pipes and their covers, and with said struts providing support and serving for the supply of air.

3. An apparatus according to claim 2, in which both of said struts have hollow profiles.

4. An apparatus according to claim 2, which includes a holder in which said ladder-like structure is adapted to be inserted in a cassette-like manner.

5. An apparatus according to claim 4, in which said holder includes two spaced-apart retainer means that have a U-shaped cross-sectional configuration and are each adapted to receive one of said struts.

6. An apparatus according to claim 2, which includes, for each of said supporting pipes, a central pipe that interconnects said struts and is centrally disposed in its supporting pipe, with said central pipe being provided with openings, as part of said first opening means of said supporting pipes, for conveying air received from one of said struts to said supporting pipes which, as part of said first opening means thereof, are provided with further openings for discharging said air to said covers.

7. An apparatus according to claim 6, in which each of said central pipes is provided with a sleeve that is displaceably disposed thereon to selectively more or less cover said openings of said central pipe.

8. An apparatus according to claim 7, in which said sleeve is threadedly received on said central pipe.

9. An apparatus according to claim 6, in which said supporting pipes have ends, and which includes rings, of elastomeric material, that surround said central pipes and resiliently connect said ends of said supporting pipes to said central pipes in such a way that said rings represent the sole connection therebetween.

10. An apparatus according to claim 9, in which said central pipes each have two ends, one of which is fixedly connected to one of said struts, and the other of which is detachably connected to the other of said struts.

11. An apparatus according to claim 10, in which said fixedly connected end of said central pipe is connected to that strut which supplies air.

12. An apparatus according to claim 10, in which said detachably connected end of said central pipe is provided with a threaded nut to tension said rings of elastomeric material.

* * * * *